(12) United States Patent
Zhao et al.

(10) Patent No.: US 9,239,740 B2
(45) Date of Patent: Jan. 19, 2016

(54) PROGRAM PARTITIONING ACROSS CLIENT AND CLOUD

(75) Inventors: Feng Zhao, Issaquah, WA (US); Jeff Mendenhall, Seattle, WA (US); Eric Bahna, Seattle, WA (US); Dennis B. Gannon, Bellevue, WA (US); Stuart H. Schaefer, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1180 days.

(21) Appl. No.: 12/485,622

(22) Filed: Jun. 16, 2009

(65) Prior Publication Data

US 2010/0318999 A1  Dec. 16, 2010

(51) Int. Cl.
  *G06F 9/46* (2006.01)
  *G06F 15/173* (2006.01)
  *G06F 9/50* (2006.01)

(52) U.S. Cl.
  CPC ........ *G06F 9/5044* (2013.01); *G06F 2209/509* (2013.01); *G06F 2209/5017* (2013.01); *Y02B 60/142* (2013.01)

(58) Field of Classification Search
  None
  See application file for complete search history.

(56) References Cited

U.S. PATENT DOCUMENTS

| | | | | |
|---|---|---|---|---|
| 6,539,445 | B1 * | 3/2003 | Krum | 710/110 |
| 6,990,662 | B2 * | 1/2006 | Messer et al. | 717/174 |
| 7,430,610 | B2 | 9/2008 | Pace et al. | |
| 7,548,977 | B2 * | 6/2009 | Agapi et al. | 709/226 |
| 8,281,311 | B2 * | 10/2012 | Barsness et al. | 718/104 |
| 2004/0018853 | A1 * | 1/2004 | Lewis | 455/552.1 |
| 2005/0273642 | A1 * | 12/2005 | Moore | G06F 11/008 714/1 |
| 2006/0155387 | A1 | 7/2006 | Pieronek | |
| 2006/0173724 | A1 * | 8/2006 | Trefler | G06Q 10/063112 705/7.14 |
| 2008/0140690 | A1 | 6/2008 | Cuomo et al. | |
| 2009/0077561 | A1 * | 3/2009 | Feng et al. | 718/104 |
| 2009/0249029 | A1 * | 10/2009 | Liu | G06K 15/02 712/28 |
| 2009/0313319 | A1 * | 12/2009 | Beisiegel et al. | 709/203 |
| 2010/0205137 | A1 * | 8/2010 | Barsness et al. | 706/52 |
| 2010/0250642 | A1 * | 9/2010 | Yellin | G06F 11/3409 709/201 |
| 2014/0040445 | A1 * | 2/2014 | Beckert et al. | 709/223 |
| 2014/0059556 | A1 * | 2/2014 | Barsness et al. | 718/102 |

OTHER PUBLICATIONS

Ou et al., "An Adaptive Multi-Constraint Partitioning Algorithm for Offloading in Pervasive Systems", Proceedings of the Fourth Annual IEEE International Conference on Pervasive Computing and Communications (PERCOM'06), 2006.*

Wang, Lei, and Michael Franz. "Automatic partitioning of object-oriented programs for resource-constrained mobile devices with multiple distribution objectives." Parallel and Distributed Systems, 2008. ICPADS'08. 14th IEEE International Conference on. IEEE, 2008.*

(Continued)

*Primary Examiner* — Abdullah Al Kawsar
(74) *Attorney, Agent, or Firm* — Steve Wight; Sandy Swain; Micky Minhas (57) ABSTRACT

Partitioning execution of a program between a client device and a cloud of network resources, exploits the asymmetry between the computational and storage resources of the cloud and the resources and proximity of the client access device to a user. Programs may be decomposed into work units. Those work units may be profiled to determine execution characteristics, modeled based on current state information and the profile, and a model performance metric (MPM) generated. Based on the MPM, work units may be partitioned between the client and the cloud.

20 Claims, 11 Drawing Sheets

(56) References Cited

OTHER PUBLICATIONS

Chun et al, "Augmented Smartphone Applications Through Clone Coud Execution" Intel Research Berkeley, 2009, 5 pages.

Christopher Mims, "Sending Cell Phones into the Cloud" Technology Review, Published my MIT, available as early as May 1, 2009, 4 pages.

Asif, et al., "Application Partitioning for Enhancing System Performance for Services Hosted on Wireless Devices", retrieved on May 24, 2010 at <<http://pgroup.usc.edu/senopt/papers/ApplicationPartitioning.pdf>>, Workshop on Service Oriented Engineering and Optimizations (SENOPT), Dec. 2007, pp. 1-15.

Balan, et al., "Tactics-Based Remote Execution for Mobile Computing", retrieved on May 24, 2010 at <<http://www.cs.cmu.edu/~satya/docdir/mobisys03.pdf>>, Proceedings of Conference on Mobile Systems, Applications, and Services (MobiSys), San Francisco, CA, May 2003, pp. 273-286.

Newton, et al., "Wishbone: Profile-based Partitioning for Sensornet Applications", retrieved on May 24, 2010 at <<http://nms.csail.mit.edu/papers/paper.pdf>>, USENIX Association, Proceedings of Symposium on Networked Systems Design and Implementation, Boston, MA, 2009, pp. 395-408.

Wang, et al., "Automatic Partitioning of Object-Oriented Programs for Resource-Constrained Mobile Devices with Multiple Distribution Objectives", retrieved on May 24, 2010 at <<http://ieeexplore.ieee.org/stamp.jsp?tp=&arnumber=4724341>>, IEEE Computer Society. International Conference on Parallel and Distributed Systems (ICPADS), 2008, pp. 369-376.

* cited by examiner

PROGRAM PARTITIONING ACROSS CLIENT AND CLOUD

BACKGROUND

Explosive growth in the use of client devices such as mobile phones, personal digital assistants, laptop computers, netbooks, desktop computers, etc. and the increasingly rich application programs demanded by users on those devices has brought to light a significant issue. Even with the recent advances in storage capacity and processing ability, the memory and computational resources of these devices are insufficient to meet the needs of those rich applications.

More recently, data networks have begun to provide access to resources in the cloud. The cloud may be considered, among other things, the combination of networks, datacenters, and other interconnected devices which together comprise an accessible whole. Given the sheer scope of the capabilities available in the cloud, there is an inherent and dramatic asymmetry between the resources available on a client device and those of the cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Programs may be decomposed into work units. Work units may then be partitioned between a device and cloud resources, allowing the program to exploit the asymmetry between the computational and storage resources of the cloud and the resources and proximity of the device to a user. This partitioning among resources may satisfy a desired set of optimization constraints expressed as a partitioning policy having policy parameters.

In one example, a work unit is profiled to determine its execution metrics. A model of the work unit is built using the profile and current state data. From this, a model performance metric (MPM) of this work unit is generated. The MPM may be based on the profile and current state data of the device and/or the cloud. A determination to partition work units between the client and the cloud based on comparison of the MPM to the partitioning policy parameters may be made.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes methods and processes for partitioning programs between a device and a collection of network resources (cloud). As used in this application, programs may be comprised of work units, which may be discrete portions of computation capable of execution dependent or independent of other work units. Work units may be defined in terms of a partitioning policy which is in place. For example, a partitioning policy configured to minimize power consumption on the device may segregate the program into work units comprising access to specific hardware devices such as a radio. A work unit may vary from a single calculation, function, library of functions, an entire program. As described below with regards to FIG. 3, the configuration of work units for partitioning may be accomplished while coding, during compile time, at runtime, during profiling, etc.

Partitioning exploits the asymmetry between the computational and storage resources of the cloud and the resources and proximity of the device to a user. In other words, the cloud may have massive computational and storage capabilities accessible via a network, while the device itself has the advantage of being physically close to the user.

As mentioned above, programs may be decomposed into work units, either by physical segregation of code or by pointers referring to code for execution. These work units may then be partitioned among resources to satisfy a desired optimization expressed as a partitioning policy. The partitioning policy may be configured to obtain a variety of desired advantages. For example, the partitioning policy may attempt to minimize power consumption on a device. The device may be computationally able to complete a work unit, but under the policy, may determine that such computation requires more battery power than transferring the work unit to a cloud resource and receiving results back.

In determining how to partition a program, the program's work units are profiled to determine their execution metrics. A model is built using the profile and current state data. A model performance metric (MPM) may then be determined for these work units using the model. Current state data may be that of the device, the cloud (including the network), or both. Based on a comparison of MPM and a partitioning policy, a determination may be made to partition work units between the client and the cloud.

Architecture of Program Partitioning

Figure 1:
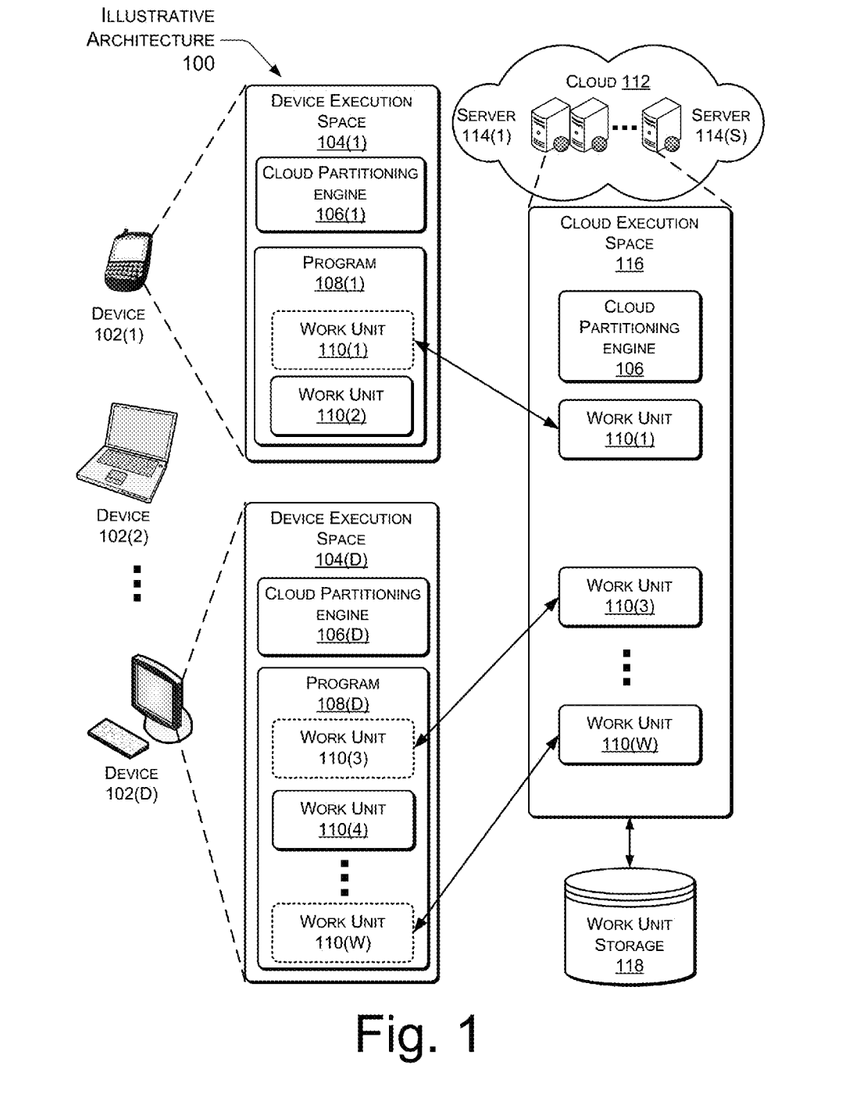
FIG. 1 is an illustrative architecture usable to implement program partitioning. Devices having a local device execution space are shown with program work units, some of which are executed in cloud execution space.

FIG. 1 is an illustrative architecture 100 usable to implement program partitioning. Devices 102(1), . . . , 102(D) are shown. These devices 102(1)-(D) may include a smartphone, laptop computer, desktop computer, netbook, server, etc.

Each device 102 has a local device execution space (DES) 104. DES 104 may be considered the environment in which work units may be executed. As used in this application, letters within parentheses, such as "(S)" or "(C)", denote any integer number greater than zero.

In the illustrated example, a smartphone device 102(1) is shown with a DES 104(1). Within DES 104(1) is a cloud partitioning engine 106(1) and a program 108(1). Program 108(1) may further include work units 110(1) and 110(2). The work units 110 are sections of code that may vary from a single calculation to an entire program. For example, work unit 110 may comprise a ray-tracing function, a database query, user-interface logic, etc. In this figure, dotted lines indicate a work unit is part of a program but executed in the cloud.

Also shown is device 102(D) which also includes a DES 104(D), cloud partitioning engine 106(D), and program 108(D). Program 108(D) may further include work units 110(3), 110(4), through work unit 110(W).

Cloud 112 is shown containing servers 114(1), ..., 114(S). The cloud 112 may be considered, among other things, the combination of networks, datacenters, servers, and other interconnected devices which together comprise an accessible whole to a device 102. Devices 102(1)-(D) may be coupled to servers 114(1)-(S) and other network resources via a network, which is omitted only for clarity of illustration. As used in this application, coupling includes physical coupling (such as an electrical connector) as well as communicative coupling (such as a wireless network connection). The network may be any type of communication network, including the Internet, a local area network, a wide area network, a wireless wide area network (WWAN), a cable television network, a wireless network, a telephone network, combinations of any of the foregoing, etc.

Within servers 114(1)-(S) is cloud execution space (CES) 116. CES 106 may be considered the environment in which work units may be executed. Within CES 116 there may be a cloud partitioning engine 106, as well as work units which have been partitioned for execution on the cloud. In this illustration, work unit 110(1) is part of program 108(1) executing in DES 104(1) on device 102(1). Work unit 110(1) has been assigned to the CES 116 for processing, such as may be the case where the computation is infeasible for the device 102 to complete. The work unit 110(1) may also be assigned to the CES 116 for any number of other reasons, such as, for example, workload of the device 102(1), battery life of the device 102(1), processing speed considerations, etc.

Other work units may also be present and executing in CES 116. For example, work units 110(3) and 110(W) which are part of program 108(D) on device 102(D) are executing within the CES 116.

CES 116 may include work unit storage 118. This work unit storage 118 may store program code, application programming interfaces (APIs) comprising program code, libraries, objects, state data, etc. For example, device 102(1) may use resources of cloud 112 to execute work unit 110(1) which calls on a particular API which is stored in work unit storage 118. Thus, the device 102(1) does not need to provide the API (and its related program code) to CES 116. Results from a work unit 110 may also be stored in work unit storage 118, for example until a scheduled communication with device 102(1).

Figure 2:
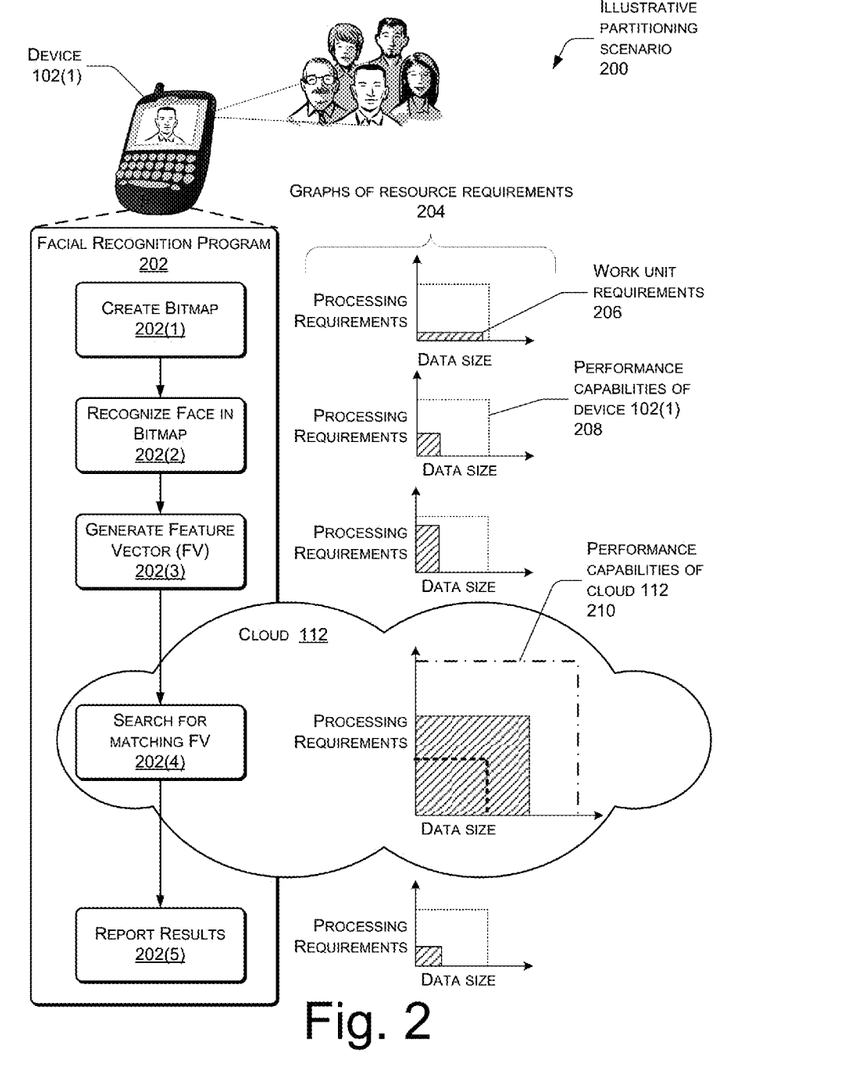
FIG. 2 is flow diagram illustrating a partitioning scenario and the asymmetry between device and cloud resources.

FIG. 2 is flow diagram 200 illustrating a partitioning scenario and the asymmetry between device and cloud resources. In this scenario smartphone device 102(1) is running a facial recognition program 202. A user wants to determine the name of a person in a group, and uses a camera built into device 102(1) to take a picture of the unidentified person.

The user runs the facial recognition program 202 to determine the identity of the unidentified person. The entire process of partitioning is described in more depth below with respect to FIGS. 9-11, but for this scenario assume the program 202 has been decomposed into multiple work units.

In this example, he facial recognition program 202 includes five work units: creating a bitmap from the camera 202(1), recognizing a face in the bitmap 202(2), generating a feature vector (FV) of the face 202(3), searching for a matching FV in a face database 202(4), and reporting results 202(5). To the right of each work unit in this diagram is a graph of resource requirements 204. The graph expresses resource requirements as a crosshatched area plot 206 of the size of data associated with the work unit versus a processing requirement, such as number of computations called for by the work unit. A dotted line 208 indicates the performance capabilities of device 102(1). For discussion purposes, these performance capabilities 208 may be considered a visual representation of the partitioning policy.

In this scenario, assume smartphone device 102(1) is executing a partitioning policy to maximize responsiveness to the user. Work units 202(1)-(3) and 202(5) execute on device 202(1), as their respective work unit requirements fall within the work performance capabilities of the device.

Work unit 202(4) involves search for a matching feature vector. This search calls for intensive processing and access to a large database of faces. Searching through thousands or millions of faces to determine a match outstrips the storage and processing capability as well as using a large amount of the communication bandwidth of smartphone device 102(1). Given the partitioning policy requirement to maximize responsiveness, the ample resources of the cloud are called upon. Indeed, without the cloud, device 102(1) would, at best, only be able to execute the search slowly and only with a limited database of faces.

Work unit 202(4) thus executes at cloud execution space 116. As illustrated in the adjacent graph, the requirements of 202(4) far exceed the performance capabilities of the device 102(1), but remain within the performance capabilities of the cloud as shown with dashed line 210, exploiting the asymmetry of abilities. The relative difference in size between the capabilities of the device 208 and the cloud 210 illustrates this asymmetry between the two.

Results from the search may be returned to device 102(1). Device 102(1) may then run work unit 202(5) to report the results to the user. Rather than simply transferring large bitmap over the network and executing the entire facial recognition program 202 in the cloud 116, only work unit 202(4) comprising the program was executed in the cloud 116. The selection of work unit 202(4) was determined by the capabilities of the device, bounded by a partitioning policy. Thus, a program 202 which otherwise would be infeasible or impossible to execute on a device 102(1) is now possible.

Figure 3:
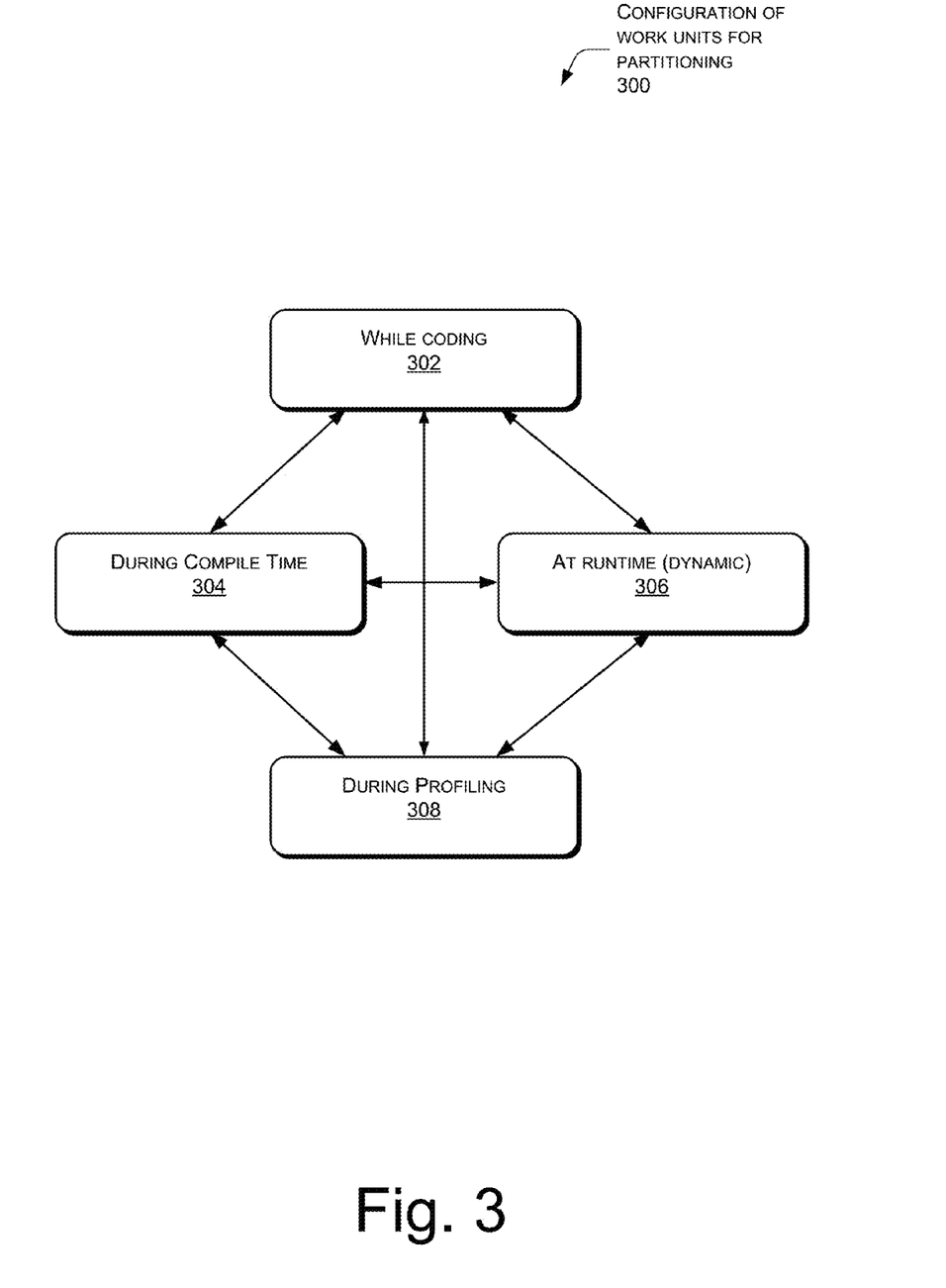
FIG. 3 is flow diagram illustrating an example of how work units may be configured to support partitioning.

FIG. 3 is flow diagram 300 illustrating how work units may be configured to support partitioning. A designer or automated coding application may configure partitioning during coding 302 of program 108. For example, specific sections of source code may be designed to execute at the DES 104 or CES 116 or both, depending upon program parameters. In one implementation, metadata may be inserted directly into the program which shows work unit boundaries and available metrics for use by profiling and partitioning software. In another implementation, the program may be instrumented to include metadata to determine partitions at runtime. Partitioning may also be configured during compile time 304. For example, a compiler may be configured to designate where portions of code are optimally executed.

At 306, dynamic configuration at runtime of partitioning is also possible. For example, an application which is not necessarily cloud-aware may be decomposed into work units and have those work units partitioned as determined by the partitioning policy.

At 308, an application may be profiled either prior to runtime, or dynamically during runtime. For example, an application may be profiled to determine which work units are best partitioned between the available resources.

Partitioning may also be configured using combinations of these elements. For example, source code may contain several options for execution, while the compiler may adjust library references to call upon libraries stored in work unit storage 118. In another example, source code may only have certain objects or subroutines designed for partitioning, while the remainder are dynamically partitioned at runtime.

Figure 4:
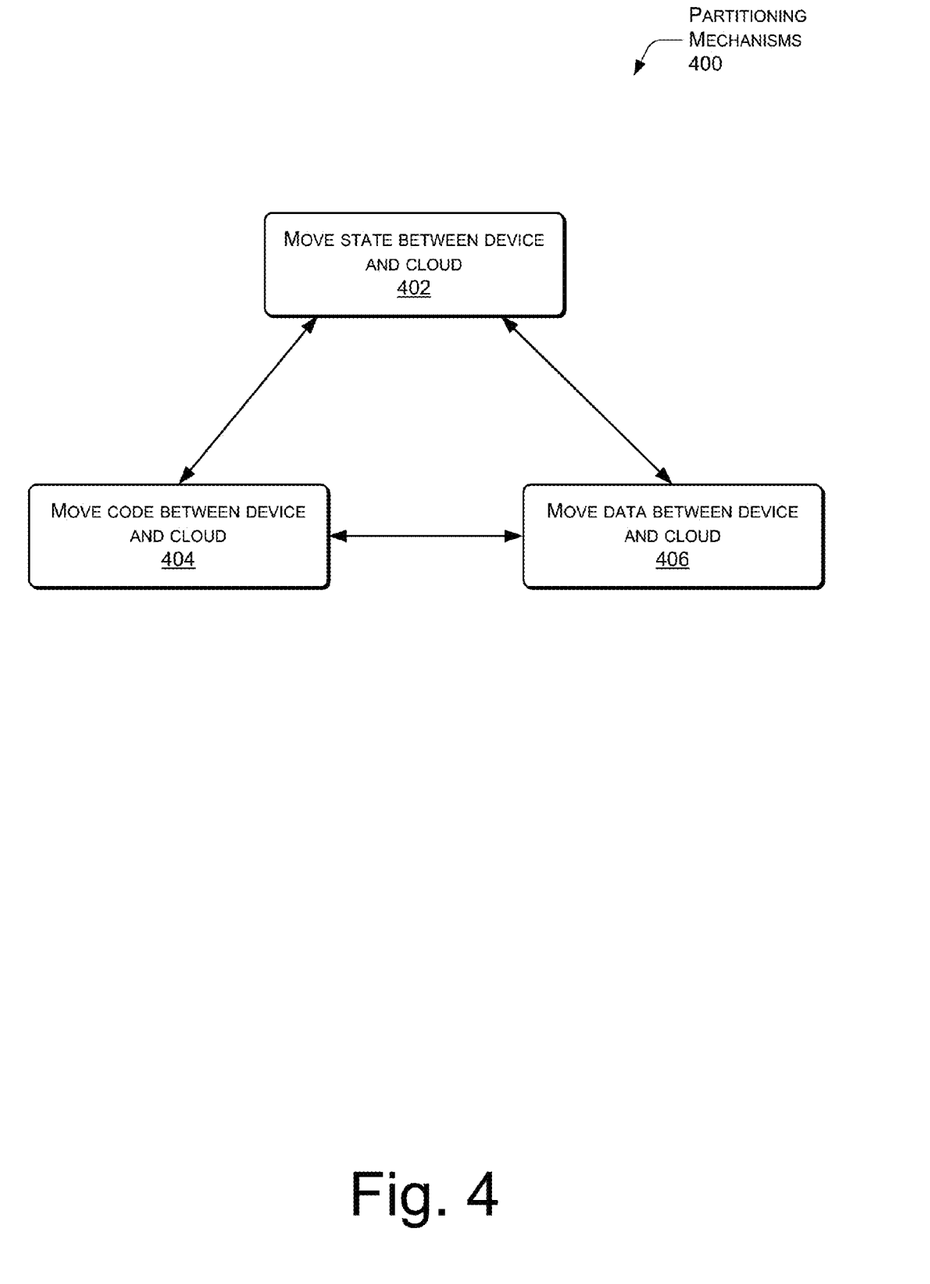
FIG. 4 is flow diagram illustrating example partitioning mechanisms.

FIG. 4 is flow diagram 400 illustrating example partitioning mechanisms. Once partitioning is initiated, the work unit or some aspect of the work unit is moved between the device 102 and the cloud 116. At 402, state of a work unit may move between the device 102 and the cloud 116 to facilitate processing. This state may be that required to initiate execution of the work unit, such as an feature vector over which it is operating and any other operational parameters. These operational parameters may include function call parameters, global, and/or non-local state elements used during execution of the work unit. At 404, code may move between the device 102 and the cloud 116. At 406, data may move between the device 102 and the cloud 116. Combinations of partitioning mechanisms are also possible. For example, code and data may be moved between the device and the cloud.

Additionally, the various ways of configuring partitioning described in FIG. 3 may be combined with the various partitioning mechanisms. For example, a developer may code an application to move state information between a device and cloud when partitioning takes place. In another example, the application may be profiled and dynamically at runtime move state information between device and cloud.

Illustrative Devices and Databases

Figure 5:
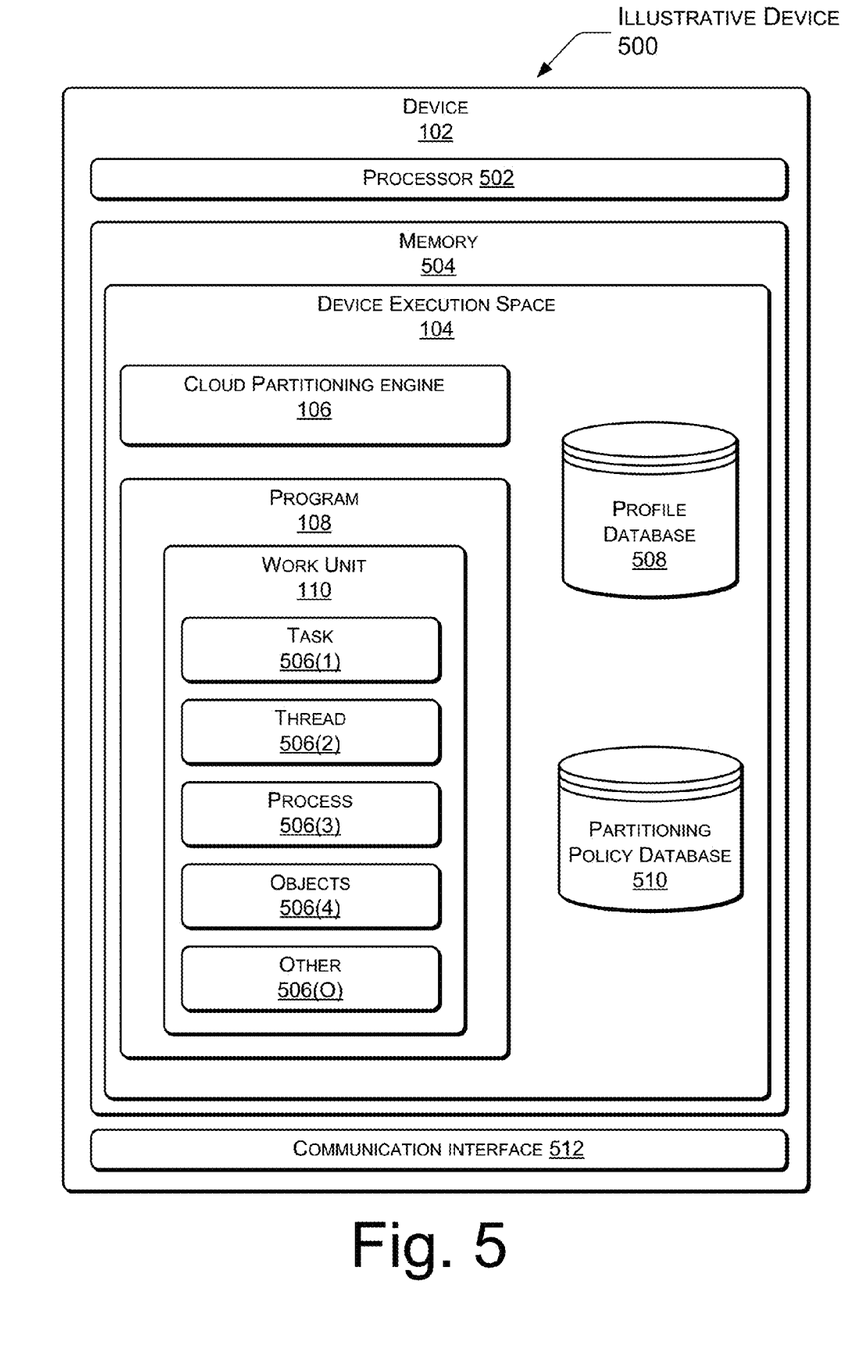
FIG. 5 is a block diagram illustrating selected portions of an example device, including the device execution space and cloud partitioning engine.

FIG. 5 shows selected portions 500 of a device 102. Device 102 may include one or more processors 502 coupled to a memory 504. The memory 504 may comprise one or more computer-readable storage media (CRSM). The CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor. The processor is configured to execute instructions stored in the memory.

Figure 7:
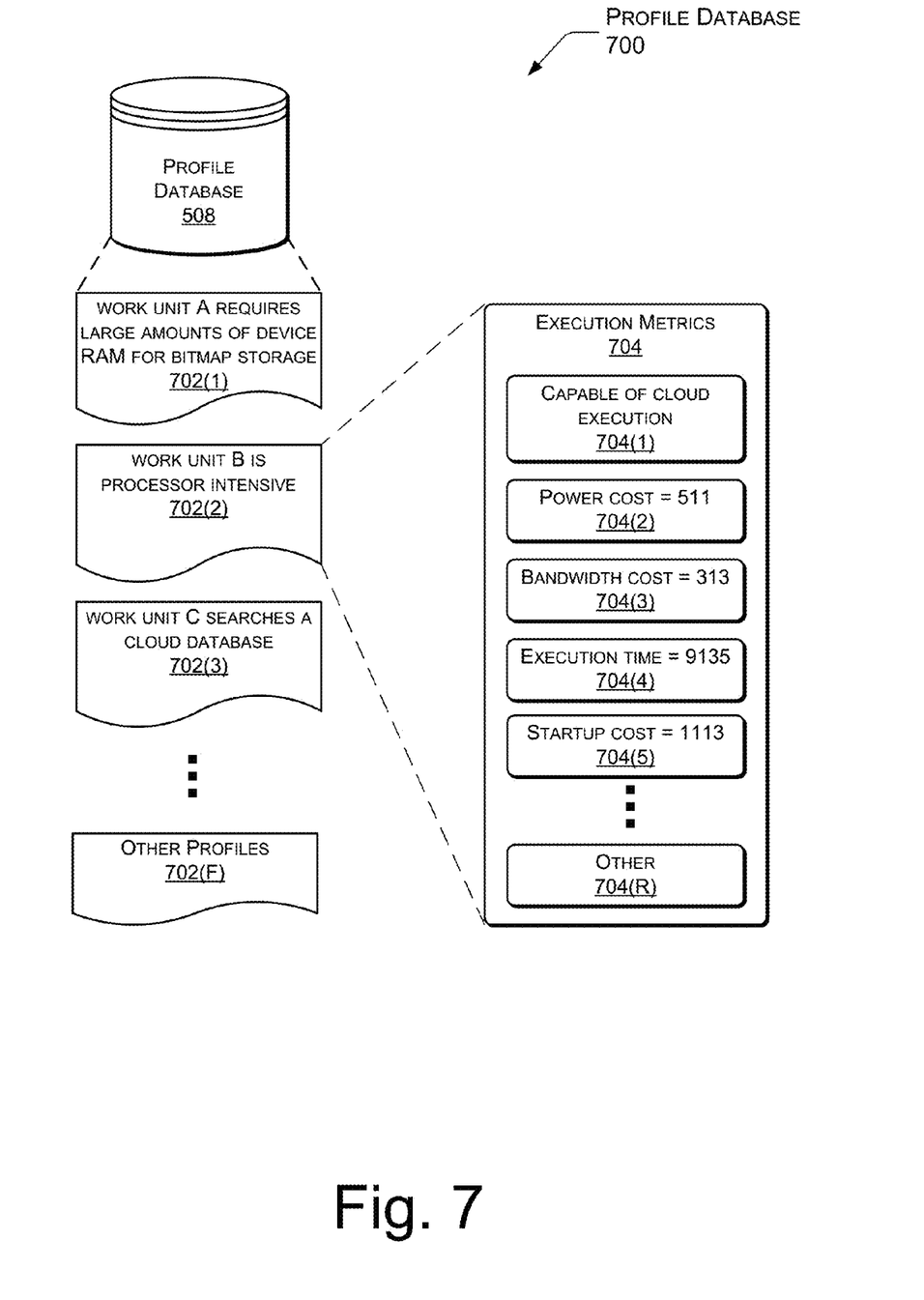
FIG. 7 is a block diagram illustrating selected example profiles from a profile database and showing work unit execution metrics for one work unit.
Figure 8:
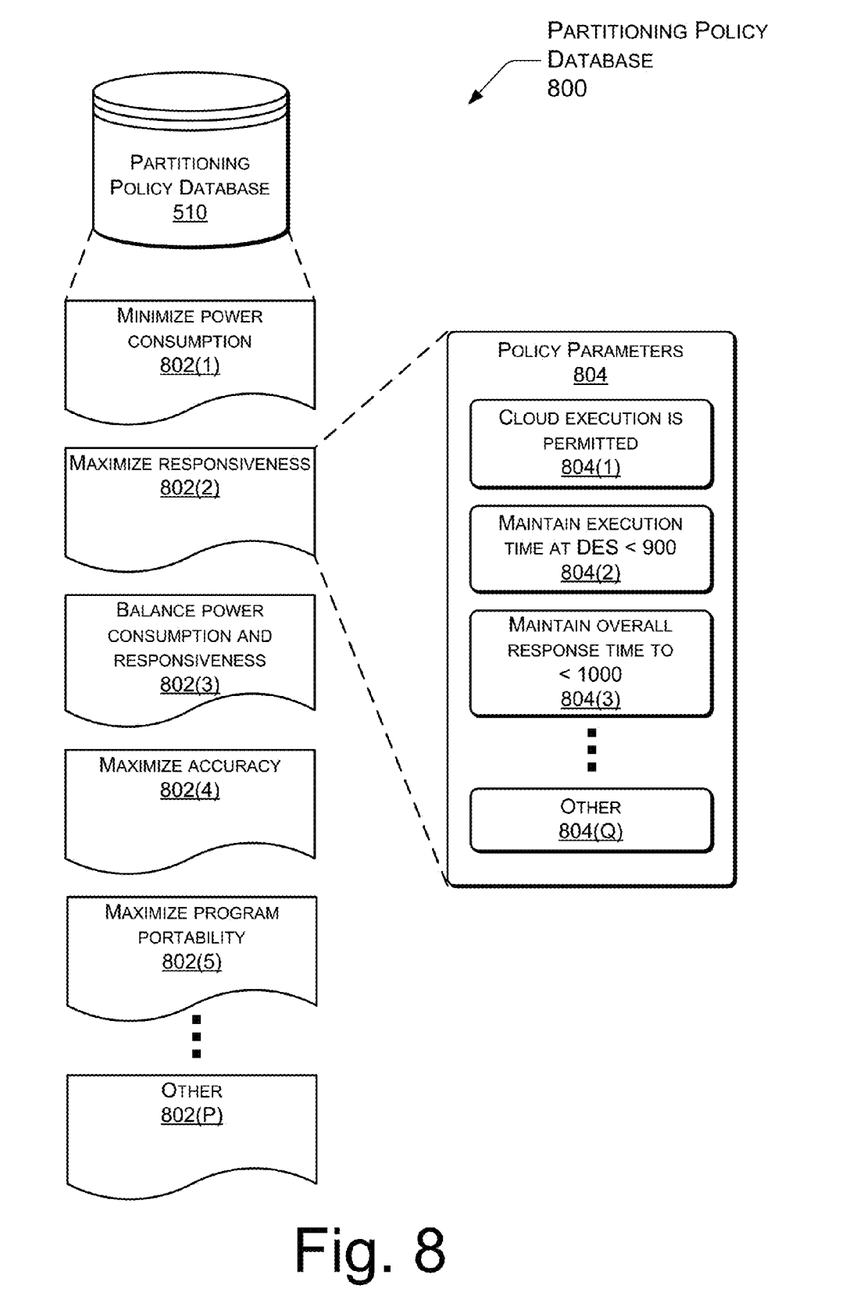
FIG. 8 is a block diagram illustrating selected example policies of a partitioning policy database and showing exemplary policy parameters for one policy.

Stored within memory 504 is device execution space 104. Within device execution space 104 may be cloud partitioning engine 106, program 108 including work unit 110, profile database 508, and partitioning policy database 510. Cloud partitioning engine 106 is discussed in more depth below with respect to FIG. 6. FIGS. 7 and 8 discuss profile database 508 and partitioning policy database 510, respectively, in more depth. In another implementation, profile database 508, or partitioning policy database 510, or both may be stored completely or partially in cloud 116.

Work unit 110 comprises discrete portions of computation which may be executed dependently or independently of one another. Work units may include tasks 506(1), threads 506(2), processes 506(3), objects 506(4), and others 506(O) such as database operations, input/output operations, etc. A work unit may vary from a single calculation to an entire program, with a level of granularity chosen as appropriate for the application at hand.

Device 102 may also include a communication interface 512 coupled to the processor 502. Communication interface 512 is capable of communicating with the network and other devices 102(1)-(D), servers 114(1)-(S), etc.

Servers 114(1)-(S) may be similar to device 102, and may have larger processors, more memory, etc. Thus, servers 114(1)-(S) may include processors, memory, and a communication interface. Within memory may be cloud execution space 116, cloud partitioning engine 106, profile database 508, partitioning policy database 510, and work unit storage 118.

Figure 6:
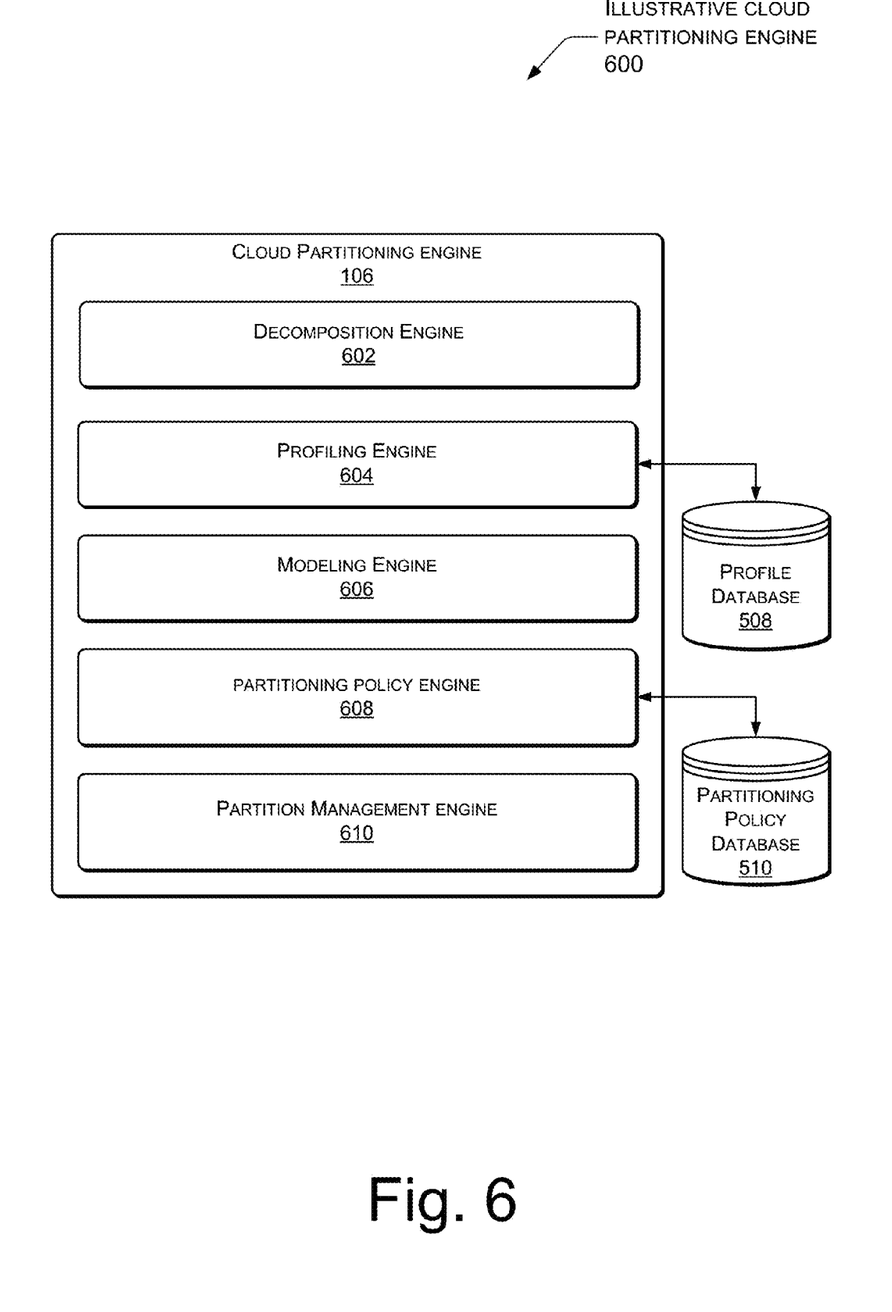
FIG. 6 is a block diagram illustrating selected portions of an example cloud partitioning engine.

FIG. 6 is a block diagram 600 illustrating selected portions of a cloud partitioning engine 106. Cloud partitioning engine 106 may include a decomposition engine 602, profiling engine 604, modeling engine 606, partitioning policy engine 608, and a partition management engine 610. In other implementations, these engines may be separate from the cloud partitioning engine 106. In another implementation, a partition management engine may be separately deployed as a resource manager over multiple cloud partitioning engines 106. Profiling may be combined with common telemetry to form an aggregating profiler.

Decomposition engine 602 determines the discrete work units present in a program. This determination may be made using elements introduced at coding, compile time, dynamically, during profiling, either individually or in combination. As necessary, decomposition engine may construct wrappers or other encapsulations, insert jump routines, dynamically inject code or trap code execution to enable an executable or functional portion to be separated into a discrete work unit.

Profiling engine 604 gathers information about work unit behavior and resource utilization during execution, and may additionally insert instrumentation data into the work unit. A profile is built from this information which describes what resources the work unit calls for. Profiles may be generated at varying levels of granularity, such as individual work units, collections of work units, or an entire program. Profiles are commonly normalized to ensure device and cloud independence. Profiling engine may communicate with profile database 508 to store and retrieve profile information. For discussion purposes, a work unit is described. Profiles may be stored in and retrieved from profile database 508. Profile database 508 may be stored on device 102 or in cloud 112, or both.

Modeling engine 606 uses the profile and current state information to estimate what resources the work unit will require for execution. Modeling engine 606 may use input from current state of the device 102, cloud (including network), 112, or both to adjust for changing conditions. Current state may describe the current status of the cloud 112, cloud execution space 116, device 102, etc. Current state is described in more detail below with regards to FIG. 10. The model may be used to generate a model performance metric (MPM) which quantifies the resource estimation.

Once the MPM has been generated, a partitioning policy engine 608 may compare the components of the MPM to the policy parameters defined in the partitioning policy and stored in partitioning policy database 510. This comparison is described in more detail below with regards to FIG. 10. Partitioning policy database 510 may be stored on device 102 or in cloud 112, or both. In another implementation, the partitioning policy engine may execute at device 102, at cloud execution space 116, or at both.

When comparison by partitioning policy engine 608 indicates optimal conditions when the work unit is performed in the cloud 112, partition management engine 610 handles the execution of the work unit in the cloud 112. Partition management engine 610 may use the partitioning mechanisms of FIG. 4 including state moves, code moves, data moves, etc.

FIG. 7 shows selected profiles 700 from a profile database 508 and also work unit execution metrics for an illustrative work unit. Profiles are built from information which describes what resources the work unit calls for. Profile database 508 may store profiles at a variety of granularities ranging from individual work units to complete programs. For discussion purposes single work units are referred to, although other granularities may be used.

Profile database 508 may contain profiles 702(1), . . . , 702(F). For example, profile 702(1) indicates work unit A requires large amounts of device RAM for bitmap storage, as may be the case in storing a picture of a face. Profile 702(2) indicates work unit B is processor intensive, as may be the case in generating a feature vector of the face. Profile 702(3) shows work unit C which searches a cloud database, such as a facial feature vector database.

Profiles may include execution metrics 704. For example, profile 702(2) may include execution metrics 704(1)-(R). For discussion purposes, execution metrics 704 may include the following: the work unit is capable of cloud execution 704(1), actual power cost of execution was 511 milliwatts 704(2), bandwidth cost was 313 kilobytes 704(3), execution time was 9,135 milliseconds 704(4), startup cost was 1113 milliseconds, and other requirements 704(R) such as memory consumption, input/output requests, etc.

Profile database 508 may receive entries from a single device or from multiple devices. For example, profiles for the same work unit executed across hundreds of the same make and model of smartphone may be aggregated to provide a more comprehensive profile. Thus, a smartphone of the same make and model which is in communication with cloud 112, it may retrieve profiles for work units rather than generating new, duplicative profiles.

FIG. 8 shows selected policies 800 of a partitioning policy database 510 as well as exemplary policy parameters of one policy. Policies may be applied at a variety of granularities ranging from individual work units to complete programs. For discussion purposes, policies are applied to individual work units, however other granularities may be used.

Partitioning policy database 510 may contain profiles 802(1), . . . , 802(P). For example, 802(1) describes a policy which seeks to minimize power consumption, such as may be used to extend battery life on a portable device. Policy 802(2) seeks to maximize responsiveness, such as may be used in a critical application such as a portable medical device. Policy 802(3) attempts to balance power consumption and responsiveness. Policy 802(4) seeks to maximize accuracy, such as a scientific application requiring high precision or use of non-cached data. Policy 802(5) attempts to maximize program portability by keeping state(s) in the cloud updated so the program may be accessed from multiple devices. For example, state information about search results may be updated by a desktop into the cloud, and accessible to a smartphone. Thus a user could initiate a search on a desktop, and continue the search from the smartphone. Other policies 802(P) may also be used, for example, minimizing cloud resources, minimizing bandwidth consumption, etc.

Policy parameters 804 for each policy may be defined. For example, parameter 804(1) may permit cloud execution of work units. Parameter 804(2) may call for maintaining execution time of a work unit at the device at less than a predetermined time, e.g., 900 milliseconds. Parameter 804(3) may define an overall response time of an entire program to a predetermined time, e.g., less than 1000 milliseconds. Other parameters 804(Q) may vary according to the nature and scope of the policy. For example, policy 802(1), which seeks to minimize power consumption, may include policy parameters indicating maximum permitted power consumption, maximum allowed clock speed on device processor, etc.

Illustrative Partitioning Process

Figure 9:
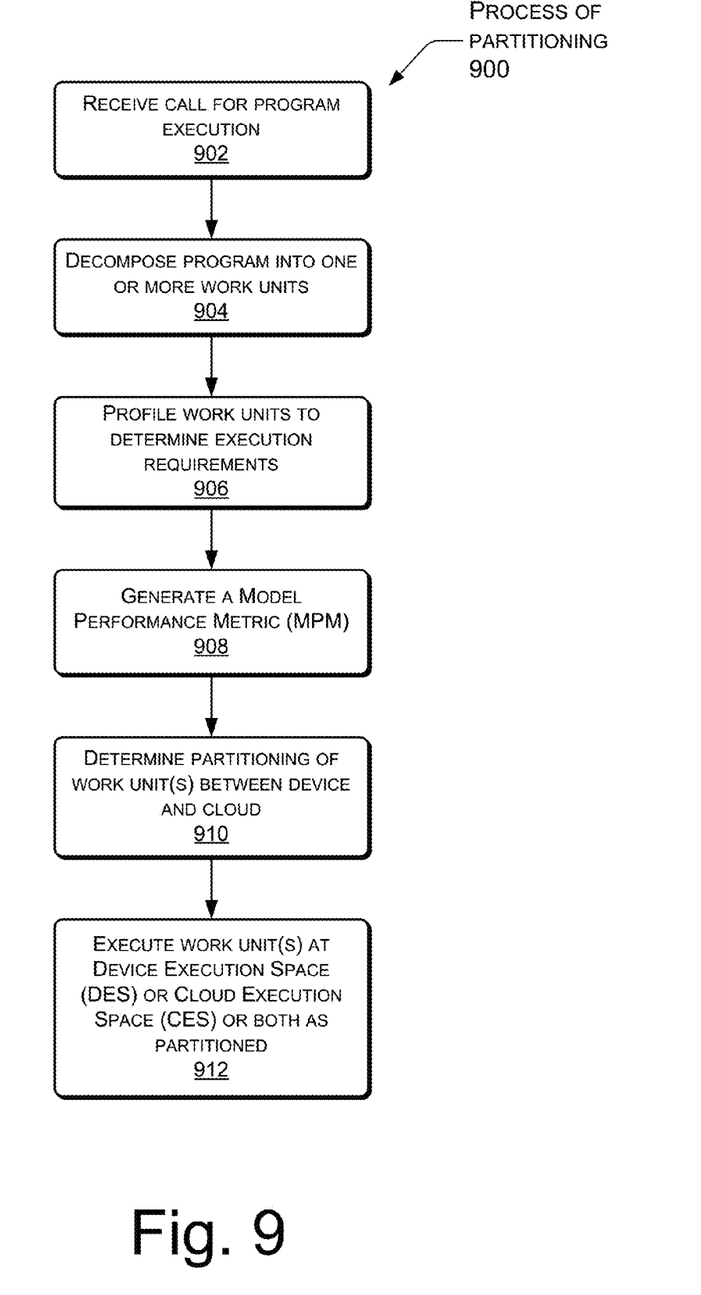
FIG. 9 is a flow diagram of an illustrative process of partitioning work units between a device execution space and a cloud execution space.

FIG. 9 shows a process 900 of partitioning work units between a DES 104 and a CES 116. The process 900 (as well as processes of FIGS. 10 and 11) is illustrated as a collection of blocks in a logical flow graph, which represent a sequence of operations that may be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes and without limitation, the process 900 (as well as processes 908 and 910 below) is described with reference to the architecture and illustrative devices and databases of FIGS. 1-8. For example, the following process may be implemented by the cloud partitioning engine 106.

At 902, a call for program execution is received. This call may be made by a scheduler, another program, user, wakeup timer, etc.

At 904, the program called for execution is decomposed into one or more work units. As described above, a work unit is a discrete portion of computation. Decomposition may be performed by decomposition engine 602, which may also construct wrappers or other encapsulations to enable an executable or functional portion to be separated into a discrete work unit.

At 906, the work units are profiled to determine execution metrics. For example, a work unit may be profiled to determine how much power it consumes during execution, what its execution time and cost is, etc. Profiling may be accomplished by profiling engine 604.

At 908, a model performance metric (MPM) may be generated. The MPM may be generated by modeling engine 606. The process of generation is discussed in more detail below with regards to FIG. 10.

At 910, a determination of which work units will be partitioned between the device and the cloud is made. This determination may be made by a partitioning policy engine 608. The process of determining how to partition is described in more detail below with regards to FIG. 11.

At 912, work units are executed at device execution space 104, cloud execution space 116, or both as determined above at 910. Work units may be managed in their execution by partition management engine 610.

In another implementation, the program may be decomposed, profiled, and partitioned during runtime. For example, execution may begin with the application running in the device execution space, and dynamically undergo partitioning of work units and assignment of those work units to the cloud execution space for execution. In another implementation, the decomposition, profiling, and partitioning during runtime described above may be ongoing during execution, resulting in dynamic changes.

Figure 10:
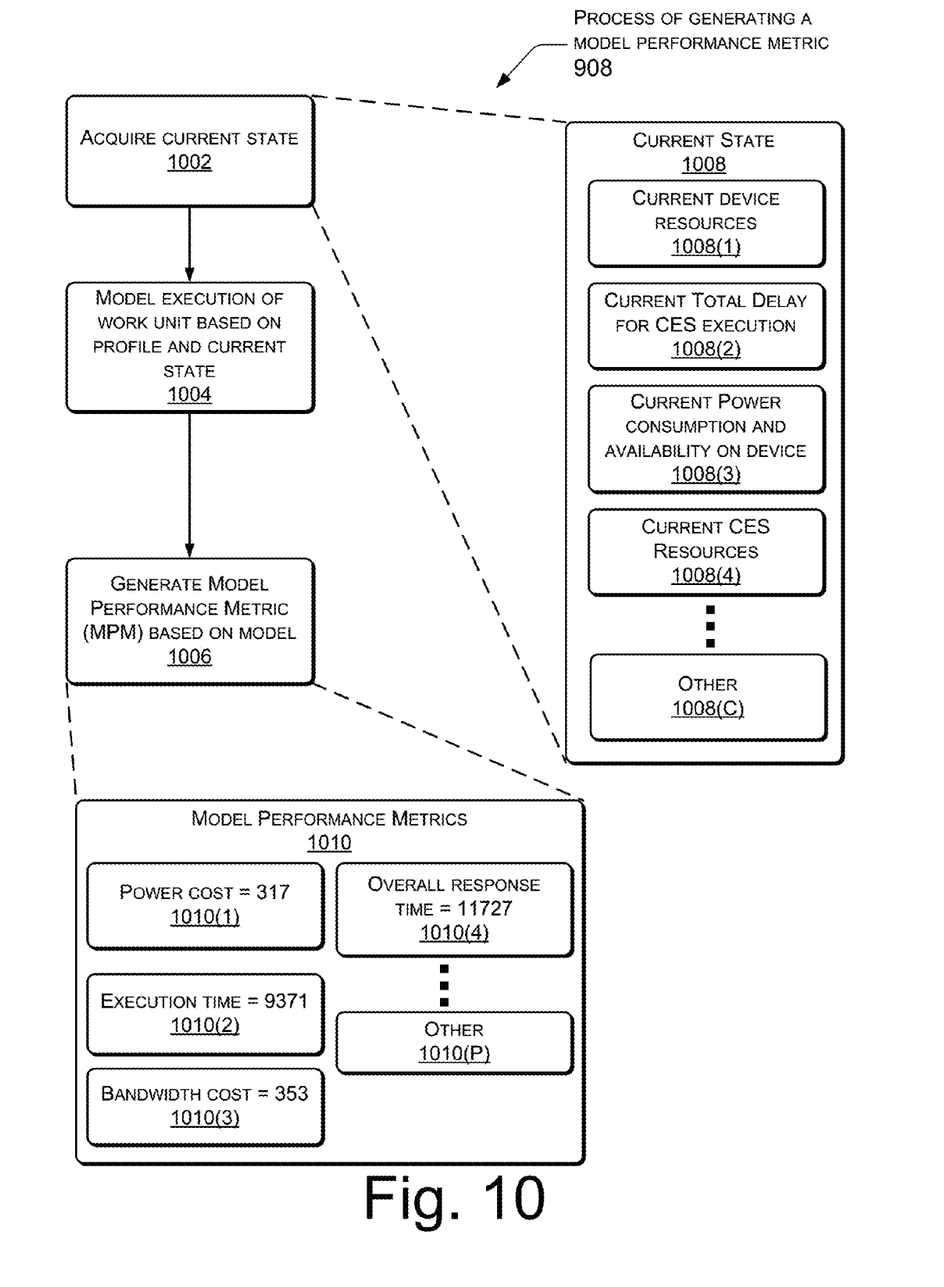
FIG. 10 is a flow diagram of an illustrative process of generating a model performance metric (MPM), and showing exemplary current state information and MPM.

FIG. 10 shows illustrative process 908 of generating a model performance metric (MPM), exemplary current state information, and exemplary MPMs. In one implementation, this process may take place within modeling engine 608.

At 1002, current state 1008 of the device 102, cloud execution space 116, or both is acquired. At 1004, execution of a work unit is modeled based on the execution profile of the work unit and the current state. At 1006, a MPM 1010 is generated, based on the model.

Current state 1008 used at 1002 may describe the current status of the cloud 112, cloud execution space 116, device 102, etc. For discussion purposes, current state may include current device resources 1008(1) such as available computational and memory capacity, current total delay for CES 116 execution 1008(2), current power consumption and power availability on the device 1008(3), current CES 116 resources 1008(4), and other information 1008(C) such as current financial cost of CES 116 resources, etc.

The MPM 1010 describes the estimated performance of the program in at least one dimension. In one implementation, the MPM comprises multiple operational dimensions such as bandwidth, processing capabilities, latency, etc. expressed as a vector quantity. In other implementations the MPM may include several discrete values. In one particular example, MPM 1010 may include a power cost of 317 milliwatts 1010(1), an execution time of 9,371 milliseconds 1010(2), bandwidth cost of 353 kilobytes 1010(3), and an overall response time of 11,727 milliseconds.

Figure 11:
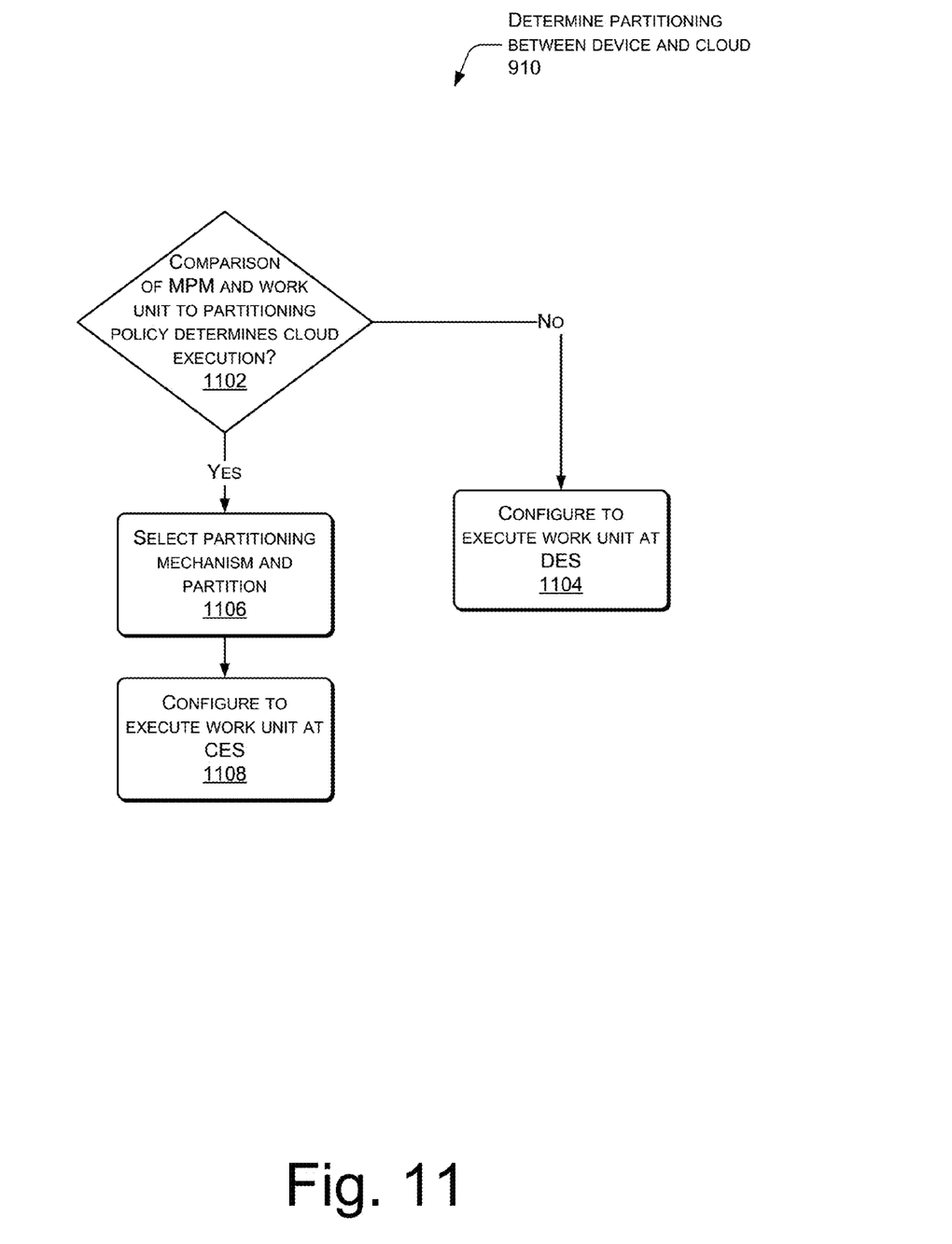
FIG. 11 is a flow diagram of an illustrative process of determining which work units to execute at device execution space or at cloud execution space.

FIG. 11 shows illustrative process 910 of determining which work units to execute at DES 104, CES 116, or at both. Execution at both the DES 104 and CES 116 may be used, for example to try and maximize response, maximize accuracy, etc. At 1102, the MPM resulting from the modeling of the work unit is compared with the partitioning policy to determine whether the work unit will be executed in DES 104 or CES 116. This comparison may be considered an assessment of a cost function for execution in DES 104 against that of execution in CES 116. The cost function places weighting factors against the vector of decision inputs, and the evaluation is to minimize the cost function. Minimization of the cost function may include the use of a linear or constraint solver. In another implementation, the modeled work unit may be directly compared with the partitioning policy.

For example, suppose the MPM indicates execution time of 9,371 milliseconds when executed on device 102, and a partitioning policy maximizing responsiveness has the parameter of maintaining execution time at DES 104 of less than 900 milliseconds. Thus, because the modeled execution time exceeds the policy parameter, this work unit would be executed at CES 116.

When the comparison at 1102 determines execution on the device (i.e., the "No" branch), at 1104 the work unit is configured to execute at DES 104.

When the comparison at 1102 determines execution at the cloud is necessary (i.e., the "Yes" branch), at 1106 a partitioning mechanism is selected and the work unit is partitioned from the remainder of the program. This partitioning mechanism may be one of the mechanisms described above with respect to FIG. 4. At 1108, the partitioned work unit is configured to execute at CES 116.

Conclusion

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. One or more memories storing instructions that, when executed by one or more processors, cause a computing device to perform acts comprising:
  decomposing a program, to be executed in association with the computing device, into a plurality of work units;
  for an individual work unit of the plurality of work units, retrieving a work unit profile that comprises information relating to execution metrics describing a consumption of device resources, wherein the information of the work unit profile is based at least in part on previous execution of the individual work unit on other computing devices of a plurality of other computing devices that have same device resources as the computing device;
  acquiring current resource state data associated with the computing device and one or more network resources, wherein the current resource state data comprises:
    current total delay information for execution of the individual work unit using the one or more network resources;
    current power consumption and power availability information of the computing device; and
    current financial cost information associated with consumption of the one or more network resources;
  constructing an execution model estimating resource consumption results to complete the plurality of work units based at least on the execution metrics and the current resource state data;
  generating a model performance metric (MPM) which consolidates the resource consumption results from the execution model;
  accessing a partitioning policy for the computing device;
  comparing the MPM and the partitioning policy to assess a cost function associated with execution of the program, the cost function placing a first weighting factor on the current total delay information, a second weighting factor on the current power consumption and power availability information, and a third weighting factor on the current financial cost information; and
  determining, based at least on the comparing, a partitioning of the program between the computing device and the one or more network resources such that at least a first work unit of the plurality of work units of the program is processed at the computing device and at least a second work unit of the plurality of work units of the program is processed at the one or more network resources.

2. The one or more memories of claim 1, wherein the determining the partitioning of the program comprises minimizing the cost function based on the execution model.

3. The one or more memories of claim 1, wherein the one or more network resources comprises a datacenter.

4. The one or more memories of claim 1, wherein the same device resources of the computing device and the plurality of other computing devices are based on a same model of devices.

5. A method comprising:
  decomposing a program into a plurality of work units at a computing device;
  for an individual work unit of the plurality of work units:
    retrieving a work unit profile that comprises information relating to execution metrics describing a consumption of resources, wherein the information of the work unit profile is based at least in part on previous execution of the individual work unit on other computing devices of a plurality of other computing devices that have same device resources as the computing device;
    generating, by one or more processors and based at least in part on the information of the work unit profile, current total delay information associated with execution of the individual work unit using one or more network resources, current power consumption and power availability information of the computing device, current financial cost information associated with consumption of the one or more network resources, and an execution model to estimate resource consumption to complete the individual work unit;
  generating a model performance metric (MPM) based at least in part on the execution model; and
  comparing the MPM to at least one partitioning policy to assess a cost function associated with execution of the program, the cost function placing a first weighting factor on the current total delay information, a second weighting factor on the current power consumption and power availability information, and a third weighting factor on the current financial cost information; and
  partitioning, based at least in part on the comparing, the program between the computing device and the one or more network resources for distributed execution.

6. The method of claim 5, wherein the at least one partitioning policy comprises at least one of:
  a first policy configured to minimize power consumption of the computing device;
  a second policy configured to maximize responsiveness of the computing device;
  a third policy configured to maximize program portability across multiple distributed devices; and
  a fourth policy configured to minimize bandwidth consumed by communications between the computing device and the one or more network resources.

7. The method of claim 5, wherein the information indicates whether execution of the individual work unit at the one or more network resources is permitted.

8. The method of claim 5, wherein the MPM is further based on current resource state data associated with the computing device, the one or more network resources, or both.

9. The method of claim 8, wherein the current state resource data describes a current processing capacity, a current storage capacity, or both, for at least one of the computing device or the one or more network resources.

10. The method of claim 5, wherein the at least one partitioning policy indicates that the individual work unit is to be executed at the computing device in less than a threshold execution time, and partitioning the program further comprises distributing the individual work unit to the one or more network resources for processing in response to estimating that an execution time of the individual work unit meets or exceeds the threshold execution time.

11. The method of claim 10, wherein a work unit comprises a task, thread, object, or process.

12. The method of claim 5, wherein the same device resources of the computing device and the plurality of other computing devices are based on a same model of devices.

13. The method of claim 5, further comprising collecting, from the other computing devices, the information of the work unit profile in response to execution of at least a portion of the program.

14. A device comprising:
  one or more processors, a memory coupled to the one or more processors, and a communication component coupled to the one or more processors configured to allow the device to communicate with one or more cloud-based resources;
  a program comprising a set of instructions, the program being stored at least partially in the memory of the device and executable at least partially by the one or more processors of the device; and
  a cloud partitioning engine stored in the memory of the device and executable by the one or more processors of the device to:
    retrieve one or more work unit profiles associated with the program, wherein an individual work unit profile comprises information relating to execution metrics describing a consumption of resources based at least in part on previous execution of an individual work unit on a plurality of other devices that have same device resources as the device;
    use the one or more work unit profiles to estimate resources required to execute the program on the device based at least in part on:
      current total delay information associated with execution of an individual work unit using the one or more cloud-based resources;
      current power consumption and power availability information of the device; and
      current financial cost information associated with consumption of the one or more cloud-based resources;
    compare the estimated resources to at least one partitioning policy to assess a cost function associated with execution of the program, the cost function placing a first weighting factor on the current total delay information, a second weighting factor on the current power consumption and power availability information, and a third weighting factor on the current financial cost information; and
    distribute work units of the program between the device and the one or more cloud-based resources for processing based at least in part on the at least one partitioning policy.

15. The device of claim 14, wherein the cloud partitioning engine is further executable by the one or more processors of the device to generate a model performance metric (MPM) based on the one or more work unit profiles.

16. The device of claim 15, wherein the cloud partitioning engine is further executable by the one or more processors to distribute the work units of the program based on a comparison between the MPM and the at least one partitioning policy.

17. The device of claim 14, wherein the work units of the program are defined when the program is compiled.

18. The device of claim 14, wherein the work units of the program are defined within source code of the program.

19. The device of claim 14, wherein the same device resources of the device and the plurality of other devices is based on a same model of devices.

20. The device of claim 14, wherein the cloud partitioning engine is further executable by the one or more processors of the device to, based on at least one operational parameter:
    move, during execution of the program, processing of at least one work unit from the device to the one or more cloud-based resources; or
    move, during the execution of the program, processing of at least work unit from the one or more cloud-based resources to the device.

\* \* \* \* \*